Figure 1:
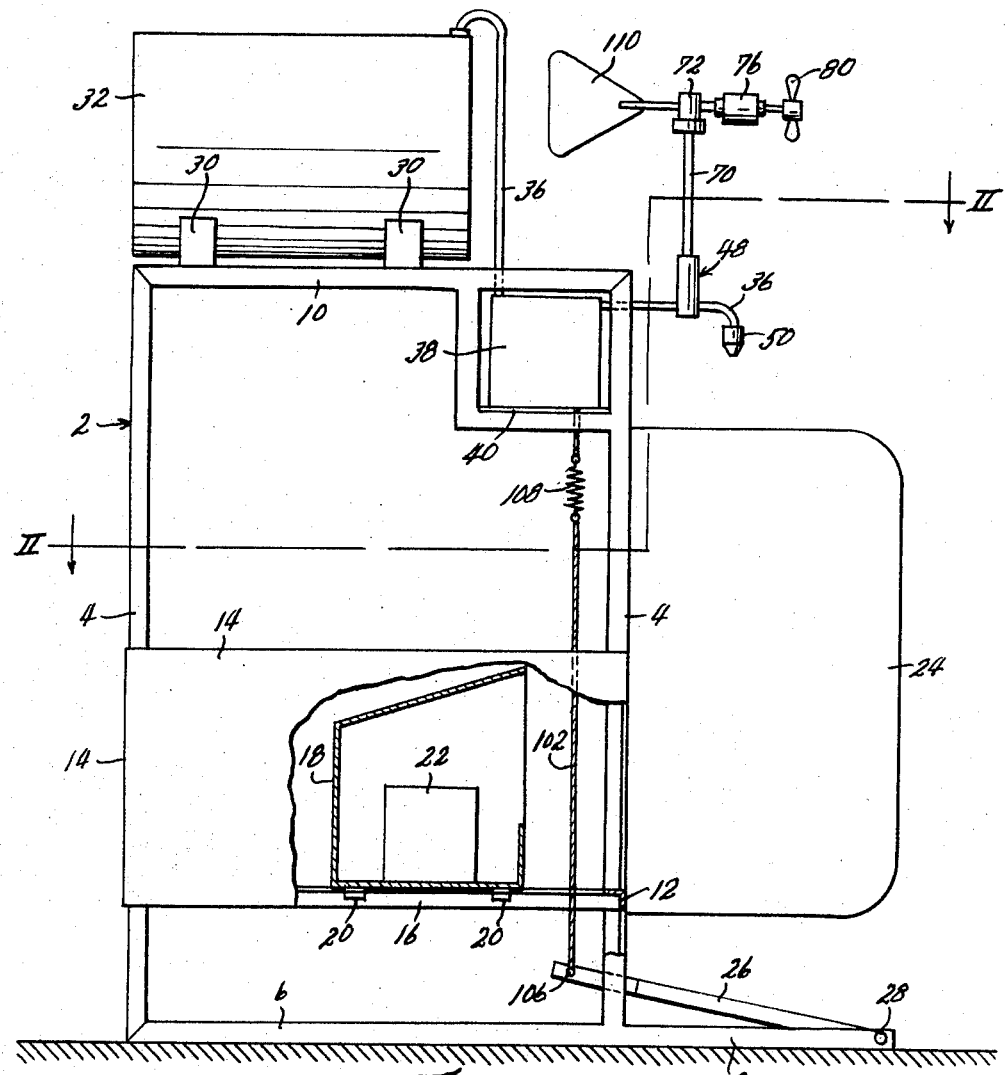

United States Patent [19]
Wilson

[11] 3,870,023
[45] Mar. 11, 1975

[54] INSECTICIDE APPLICATOR FOR LIVESTOCK

[76] Inventor: Rolland E. Wilson, Rt. 1, Prescott, Kans. 66767

[22] Filed: Sept. 12, 1973

[21] Appl. No.: 396,354

[52] U.S. Cl. ............................................. 119/159
[51] Int. Cl. .......................................... A01k 29/00
[58] Field of Search ................................... 119/159

[56] References Cited
UNITED STATES PATENTS
3,032,011   5/1962   Stramel .............................. 119/159
3,173,402   3/1965   Cassel ................................ 119/159

*Primary Examiner*—Hugh R. Chamblee
*Attorney, Agent, or Firm*—John A. Hamilton

[57] ABSTRACT

An insecticide applicator for livestock consisting of a stall-like enclosure which animals must approach in a single direction to obtain access to a feed product contained therein, an animal in so approaching depressing a treadle, and mechanism actuated by depression of the treadle to spray the animal with a liquid insecticide. The enclosure may be adjusted to the size of the animals. A control system is provided which limits the duration of the spray for each depression of the treadle, so that each animal cannot be over-sprayed, and including a wind-controlled device for varying the nature of the spray, i.e., coarse or fine, depending on the wind velocity, so as to avoid loss of the insecticide due to the wind.

5 Claims, 3 Drawing Figures

INSECTICIDE APPLICATOR FOR LIVESTOCK

This invention relates to new and useful improvements in insecticide applicators for livestock, and has particular reference to insecticide applicators of the spray type.

The principal object of the present invention is the provision of an insecticide applicator wherein the insecticide is sprayed on the animal in the form of a powered spray, whereby to insure better penetration thereof to the skin through the hair, the animal being lured to the effective zone of the spray nozzle or nozzles, and retained there for a sufficient time to complete the insecticide application, by means of a special enclosure containing salt, feed or the like. The spray is actuated by a treadle depressed by the animal as it enters said enclosure.

Another object is the provision in an insecticide applicator of the character described of means for limiting the duration of the spray for each depression of the treadle, whereby to prevent over-spraying of the animal, which could be harmful to the animal as well as wasteful of the insecticide.

A further object is the provision of an insecticide applicator of the character described which is specially adapted for use in the open where the spray is subject to wind, by the provision of a wind-actuated device operable to provide the most desirable finely divided spray under conditions of no wind or low wind, a coarser spray of larger droplets, and hence less affected or blown by the wind, at higher wind velocities, and to shut off the spray completely when the wind velocity reaches a still greater level.

Other objects are simplicity and economy of construction, efficiency and dependability of operation, and adaptability for use with various types of livestock animals.

Figure 2:
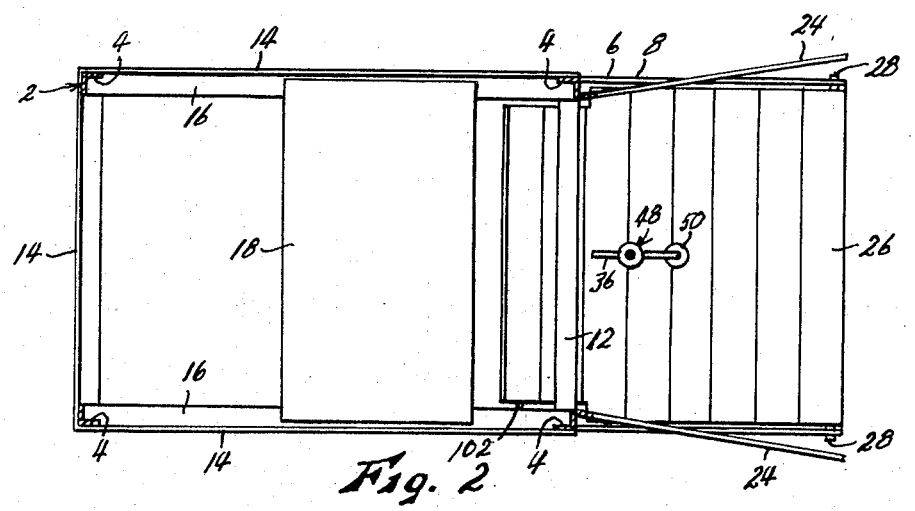
Figure 3:
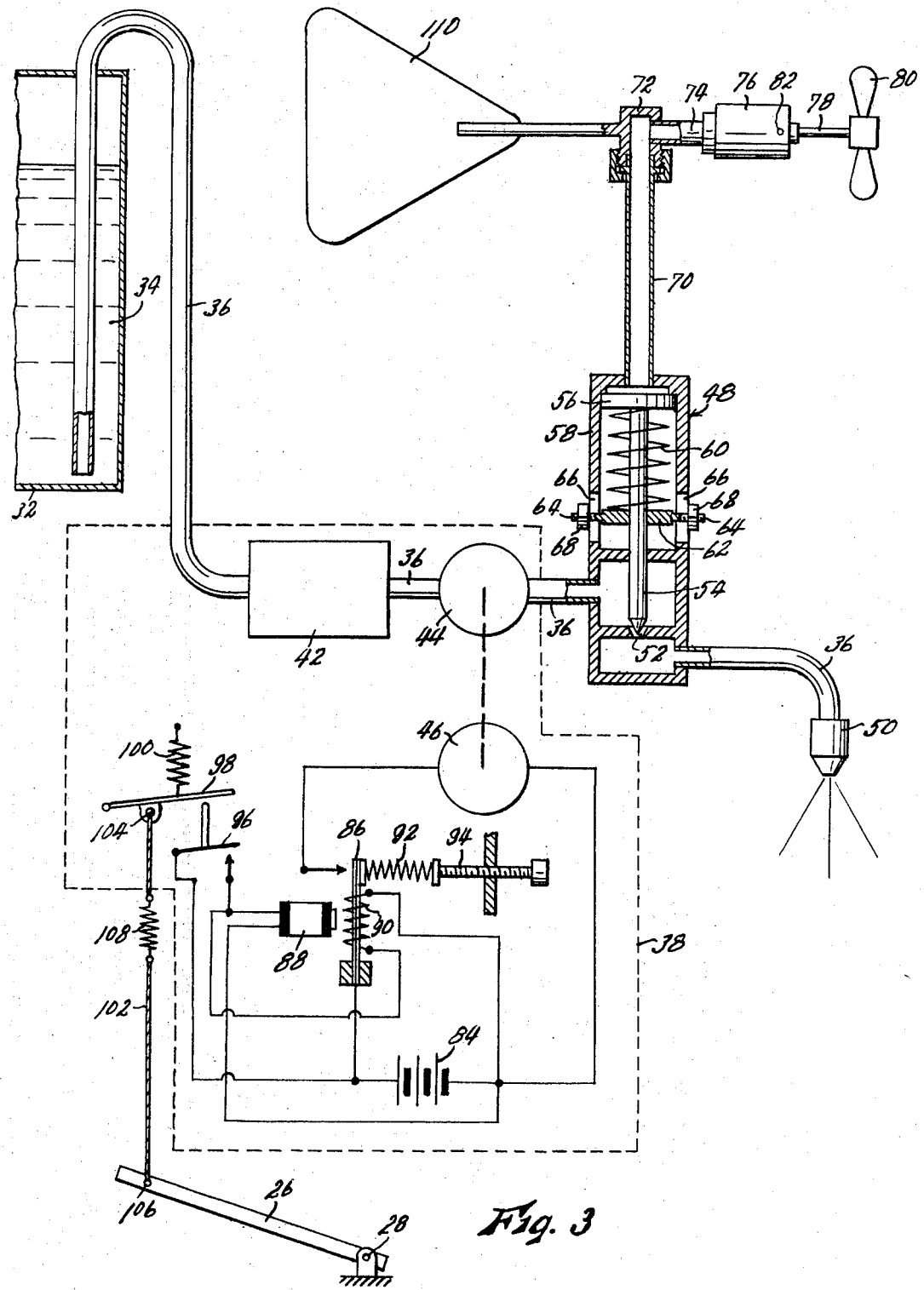

With these objects in view, as well as other objects which will appear in the course of the specification, reference will be had to the accompanying drawing, wherein:

FIG. 1 is a side elevational view of a livestock insecticide applicator embodying the present invention, FIG. 2 is a sectional view taken on line II—II of FIG. 1, and FIG. 3 is a schematic layout of the control system of the applicator.

Like reference numerals apply to similar parts throughout the several views, and the numeral 2 applies generally to a rectilinear frame including four vertical corner posts 4 connected at their lower ends by a horizontal ground-engaging bottom frame 6 having a forward extension 8, and connected at their upper ends by a horizontal top frame 10. Frame 2 is substantially taller than the animals to be treated, and is open at its front except for a cross bar 12 extending horizontally thereacross about a foot to 1½ feet above the ground. The sides and rear of the frame may have solid panels 14 applied thereto as protection from the wind. A pair of rails 16 extend horizontally along the sides of the frame and are affixed in said frame, being parallel with each other and disposed at about the same elevation as cross bar 12. An open-fronted feed box 18 extends across the frame and is slidably supported at its sides on rails 16, being attached thereto by sliding clips 20 so that it may be moved forwardly and rearwardly to vary its spacing from cross bar 12. It may contain a salt block 22, or other feed or feed supplement materials attractive to the animals. Attached to each front corner post 4 is a vertical panel 24, said panels diverging forwardly over forward frame extension 8. A treadle 26 is pivoted at its forward edge, as at 28, to the forward end of extension 8, on a horizontal transverse axis, and extends rearwardly beneath cross bar 12 of the frame.

Supported on the top of frame 2 by cradles 30 is a drum or tank 32 containing the liquid insecticide 34 to be used. A delivery pipe 36 projects downwardly into said drum to a point adjacent the bottom thereof. Externally of the drum, the pipe enters a control box 38 mounted on a shelf 40 in the upper portion of frame 2 and is connected to a filter 42 mounted in said box for removing impurities from the insecticide. The insecticide is often carried in a petroleum distallate, which often contains sufficient solid impurities to foul the spray nozzle. From the filter, the insecticide passes to a fluid pump 44 driven by an electric motor 46, both also mounted in box 38, then emerges from said box, passes through a wind-controlled throttle valve to be described and designated generally by the numeral 48, and finally is delivered to a spray nozzle 50 disposed at such a position as to be directly above the withers of an animal standing on treadle 26 and feeding from box 18. It will be understood that more than one nozzle may be used, so disposed as to provide effective spray coverage of additional or even all parts of the animal. Nozzle 50, or all of such nozzles if more are used, are of a type which will provide a finely divided mist-type spray when supplied at a higher pressure, and a relatively coarse spray of comparatively large droplets when supplied at lower pressures. In other words, the fineness of the spray is generally proportionate to the pressure at which fluid is delivered thereto. Nearly all spray nozzles have this characteristic to some extent, and suitable nozzles are commercially available, so that a detailed showing thereof is deemed unnecessary.

Throttling valve 48 is best shown in FIG. 3, the insecticide passing through a valve seat 52 regulated by a needle valve stem 54 connected to a piston 56 movable in a cylinder portion 58 of the valve body. The stem is urged in a direction to open the valve by a compression spring 60 disposed between the piston and an abutment member 62 disposed in the cylinder and adjustably secured therein, whereby to adjust the tension of the spring, by bolt studs 64 extending outwardly through elongated slots 66 of the cylinder wall and having nuts 68 threaded thereon. The stem is moved in a direction to throttle valve seat 52, against the pre-set resistance of spring 60 by air pressure above piston 56 in cylinder 58. A tubular stem 70 opens at its lower end into cylinder 58 above piston 56 and extends upwardly, being connected at its upper end by a tubular swivel fitting 72 to a horizontal tube 74 on which is mounted an air pump 76 driven by a horizontal drive shaft 78 on which is affixed a wind-driven propeller 80. Pump 76 is operable when actuated by propeller 80 to take in air at inlet 82 thereof, and to deliver it to cylinder 58 at a pressure proportionate to the speed of rotation of the propeller.

Electric current for operating pump motor 46 is supplied by a storage battery 84, which may also be carried in control box 38, or any other suitable source of electric power, which is operably connected to said motor in series with a normally open thermostatic relay 86 which may be closed by energization of its coil 88, but which will again open after a pre-determined time delay when a heater element 90 forming a part thereof is energized. The time delay is determined by the resistance to opening supplied by a spring 92, the tension of which may be adjusted by manually turning screw 94. Relay coil 88 and heater element 90 are connected to battery 84 in parallel, both under the control of a normally open mechanical switch 96. Switch 96 is closed by downward pivoting of a lever 98 normally held elevated by a spring 100, but which is connected to treadle 26 by a vertically extending cable 102. The cable is attached to lever 98 at 104, and to the rearward or free edge portion of treadle 26 at 106, and has interposed therein a tension spring 108. Springs 100 and 108 are of sufficient strength to hold treadle 26 normally elevated as shown, while spring 108 yields after switch 96 is closed by the depression of treadle 26 by the weight of an animal, to prevent undue loading of the lever and switch.

In operation, the animal is lured onto the treadle 26 by the salt block 22 or other feed material in feed box 18. It can approach in only one direction, due to the restraint of panels 24, and will approach only to cross bar 12, so that it is disposed correctly relative to spray nozzle 50. The animal will not ordinarily step over cross bar 12, even though it is fully capable of doing so, if in this position it can conveniently extend its head into feed box 18 to gain access to its contents. Thus the device can be adapted for use with animals of different sizes simply by sliding the feed box 18 forwardly or rearwardly to such a position that to gain access to the feed box, the animal must closely approach cross bar 12, but need not step thereover, and thereby insure proper placement of the animal relative to the spray nozzle.

As the animal approaches the described position, its weight of course depresses treadle 26, and the treadle remains depressed as long as the animal occupies this position. Depression of the treadle operates through cable 102 and lever 98 to close switch 96. Closure of switch 96 completes the operative electric circuits both of relay coil 88, which closes relay 86 to complete the circuit of motor 46 to drive pump 44 to deliver insecticide to nozzle 50 to spray the animal, and also of heater element 90, the energization of which however does not immediately open the relay. After a pre-determined time delay the heater element will cause the relay to open, even though relay coil 88 is still energized, shutting the pump motor off, and the relay will thereafter remain open and the animal will not be sprayed further no matter how long it remains on the treadle. The time delay of the opening of the relay is determined by adjusting the tension of spring 92, and is of course selected to deliver the desired quantity of insecticide to the animal. The system cannot be reactivated until the animal leaves the treadle, which allows switch 96 to open to deactivate heater element 90, and another animal depresses the treadle. Overspraying of each animal is thus prevented.

The fineness of the spray delivered by the nozzle, as dictated by wind velocity, is controlled by throttling valve 48. While a fine spray is normally desired, for better coverage and penetration of hair, a fine spray would obviously tend simply to be blown away by wind, while a coarser spray, with larger and hence heavier droplets would still reach and treat the animal. In the present structure, operation of propeller 80 by the wind, said propeller being kept facing into the wind by a vane 110 mounted on swivel fitting 72 at the side thereof opposite from the propeller, delivers air under a pressure proportionate to wind velocity to cylinder 58 to depress piston 56 against spring 60, lowering stem 54 to throttle valve seat 52, so that the pressure of the fluid supply to nozzle 50 is reduced, and the nozzle delivers a coarser spray. The capacity of valve 48, and the tension of spring 60, can be selected and adjusted to supply the desired control function for any desired number of nozzles. It will also be seen that a very high wind may cause complete closure of valve 48, so that no fluid is supplied to the nozzle at all. This is a desirable function, so long as the tension of spring 60 is so set that it occurs only when the wind velocity is so high that the spray, or an uneconomically high proportion thereof, would be blown away no matter how coarse it may be.

While I have shown and described a specific embodiment of my invention, it will be readily apparent that many minor changes of structure and operation could be made without departing from the spirit of the invention.

What I claim as new and desire to protect by Letters Patent is:

1. An insecticide applicator for livestock comprising:
   a. a frame,
   b. an insecticide reservoir carried by said frame,
   c. a spray nozzle carried by said frame and operable to direct a spray against an animal standing in a use position relative to said frame, said nozzle being interconnected to said reservoir to receive insecticide therefrom, and
   d. a control system including actuating means operable by the presence of an animal in said use position to cause operation of said control system to deliver insecticide from said reservoir to said nozzle, said control system comprising a pump operable when actuated to deliver insecticide from said reservoir to said nozzle, an electric motor operable to drive said pump, an operative electrical circuit for said motor, a normally open first switch in said motor circuit, electrically operated switch closing means operable to close said first switch whenever energized, electrically operable switch opening means operable to open said first switch a predetermined time after it is energized, even when said switch closing means is energized, an operating electrical circuit for said switch closing and switch opening means, and a normally open mechanical switch disposed in said last-named circuit, operation of said actuating means being operable to close said mechanical switch as long as said animal occupies said use position.

2. The structure as recited in claim 1 with the addition of means for adjustably varying the time-delay factor of said switch opening means.

3. The structure as recited in claim 1 wherein said first switch comprises a thermostatic relay having an armature adapted by heating thereof to open the relay contacts, wherein said switch closing means comprises the coil of said relay, wherein said switch opening means constitutes a heater element operable to heat said armature, and with the addition of:
   a. a spring resisting opening movement of said armature, and
   b. means for adjusting the tension of said spring.

4. An insecticide applicator for livestock comprising:
   a. a frame,
   b. an insecticide reservoir carried by said frame, c. a spray nozzle carried by said frame and operable to direct a spray against an animal standing in a use position relative to said frame, said nozzle being interconnected to said reservoir to receive insecticide therefrom, d. a control system including actuating means operable by the presence of an animal in said use position to deliver insecticide from said reservoir to said nozzle, and e. nozzle control means operable by wind to cause said nozzle to deliver a relatively finely divided spray when said wind has a relatively low velocity, and to deliver a progressively coarser spray as said wind velocity increases.

5. The structure as recited in claim 4 wherein said spray nozzle is operable to deliver a relatively finely divided spray when supplied with insecticide at a relatively high pressure, and to deliver progressively coarser sprays as said supply pressure is reduced, and wherein said nozzle control means comprises:

a. an adjustable throttling valve interposed in a conduit connecting said reservoir to said nozzle, b. resilient means biasing said valve to an open position, c. an adjustable spring resisting closing of said valve, d. air pressure actuated means operable to restrict said valve against the pressure of said spring, e. an air pump operable to deliver air to said pressure actuated means at a pressure proportionate to its speed of operation, and f. a wind driven propellar operable to drive said air pump.

* * * * *